US011594791B2

(12) United States Patent
Zeng et al.

(10) Patent No.: US 11,594,791 B2
(45) Date of Patent: *Feb. 28, 2023

(54) SECONDARY BATTERY AND METHOD OF MANUFACTURING THE SECONDARY BATTERY

(71) Applicant: Contemporary Amperex Technology Co., Limited, Ningde (CN)

(72) Inventors: Yuqun Zeng, Ningde (CN); Fenggang Zhao, Ningde (CN); Qingyuan Jiang, Ningde (CN); Bo Han, Ningde (CN); Jiacai Cai, Ningde (CN); Qinglin Bai, Ningde (CN); Yuqian Wen, Ningde (CN); Zhiyang Wu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 161 days.

This patent is subject to a terminal disclaimer.

(21) Appl. No.: 16/666,754

(22) Filed: Oct. 29, 2019

(65) Prior Publication Data

US 2020/0144585 A1 May 7, 2020

(30) Foreign Application Priority Data

Nov. 7, 2018 (CN) .......................... 201811320340.7

(51) Int. Cl.
*H01M 50/543* (2021.01)
*H01M 4/66* (2006.01)
(Continued)

(52) U.S. Cl.
CPC ......... *H01M 50/543* (2021.01); *H01M 4/661* (2013.01); *H01M 50/172* (2021.01); *H01M 50/531* (2021.01)

(58) Field of Classification Search
CPC ....... H01M 4/661; H01M 50/172–181; H01M 50/531–536; H01M 50/543–569; H01M 50/296
See application file for complete search history.

(56) References Cited

U.S. PATENT DOCUMENTS 9,461,296 B2 10/2016 Kohno et al.
11,050,128 B2 * 6/2021 Zeng .................. H01M 50/543
(Continued)

FOREIGN PATENT DOCUMENTS

CN 102208592 A 10/2011
CN 104466076 A 3/2015
(Continued)

OTHER PUBLICATIONS

Machine translation of KR-20180032061-A (Year: 2018).*
(Continued)

*Primary Examiner* — Matthew T Martin
*Assistant Examiner* — Unique Jenevieve Luna
(74) *Attorney, Agent, or Firm* — East IP P.C.

(57) ABSTRACT

The present disclosure relates to a secondary battery and a method of manufacturing the secondary battery. The secondary battery includes: a case; an electrode assembly, accommodated in the case and including a main body and a tab connected to the main body; a cap plate, coupled to the case; an electrode terminal, located on an outer side of the cap plate and including a first metal layer and a second metal layer disposed one on top of another; and a current collecting member, connected between the tab and the electrode terminal.

12 Claims, 11 Drawing Sheets

(51) Int. Cl.
*H01M 50/172* (2021.01)
*H01M 50/531* (2021.01)

(56) References Cited

U.S. PATENT DOCUMENTS

| | | | |
|---|---|---|---|
| 2015/0086867 A1* | 3/2015 | Oda | H01M 50/543 |
| | | | 429/211 |
| 2016/0276645 A1 | 9/2016 | Koo | |
| 2016/0359159 A1 | 12/2016 | Yoo et al. | |
| 2018/0034095 A1* | 2/2018 | Yoshida | H01M 4/13 |
| 2018/0183018 A1* | 6/2018 | Maeda | H01M 50/543 |
| 2018/0233714 A1 | 8/2018 | Guo et al. | |

FOREIGN PATENT DOCUMENTS

| | | |
|---|---|---|
| CN | 106299172 A | 1/2017 |
| CN | 106784445 A | 5/2017 |
| CN | 207233788 U | 4/2018 |
| CN | 108428821 A | 8/2018 |
| CN | 207800665 U | 8/2018 |
| EP | 2860786 A1 | 4/2015 |
| KR | 20180032061 A * | 3/2018 |

OTHER PUBLICATIONS

The first office action and search report dated Jul. 17, 2020 for Chinese Application No. 201811320340.7, 13 pages.
The first office action and search report dated Oct. 5, 2020 for European Application No. 19206262.8, 5 pages.
The extended European search report dated Mar. 20, 2020 for European Application No. 19206262.8, 10 pages.

* cited by examiner providing an electrode assembly including a main body and a tab connected to the main body providing a current collecting member, and connecting and fixing the tab to the current collecting member, wherein the current collecting member includes an extending portion;

providing an electrode terminal and a cap plate, wherein the electrode terminal is located on an outer side of the cap plate and includes a first metal layer and a second metal layer disposed one on top of another, and the second metal layer is located on a side of the first metal layer away from the cap plate and is made of different material from the first metal layer, and wherein the electrode terminal is provided with a stepped hole, which includes a first hole segment penetrating through the first metal layer and a second hole segment penetrating through the second metal layer and extending into the first metal layer inserting the extending portion into the first hole segment from an inner side of the cap plate, wherein the first metal layer is made of the same material as the current collecting member providing a case, loading the electrode assembly into the case, and performing laser welding from the outer side of cap plate so as to weld the extending portion to the first metal layer by the laser welding

Fig. 13

SECONDARY BATTERY AND METHOD OF MANUFACTURING THE SECONDARY BATTERY

CROSS REFERENCE TO RELATED APPLICATION

This application claims priority to Chinese Patent Application No. 201811320340.7, filed on Nov. 7, 2018, which is hereby incorporated by reference in its entirety.

TECHNICAL FIELD

The present disclosure relates to a technical filed of batteries, and particularly relates to a secondary battery and a method of manufacturing the secondary battery.

BACKGROUND

New energy vehicles are widely promoted in China and the world, but there are still many improvements that need to be made to completely replace fuel vehicles with the new energy vehicles. For example, problems, such as small driving distance, high cost of a battery pack, and low reliability of the battery pack still need to be further solved. In view of the above problems, higher requirements have been placed on secondary batteries, core parts of electric vehicles, for example, the secondary batteries are required to have a higher energy density, a lower cost, and the like.

In the prior art, a secondary battery includes a case, an electrode assembly disposed in the case, a cap plate coupled to the case, and an electrode terminal disposed on the cap plate. The cap plate is provided with a mounting hole, and the electrode terminal is mounted in the mounting hole, with a part located on an outer side of the cap plate, and a part located on an inner side of the cap plate. Both of the part of the electrode terminal located on the outer side of the cap plate and the part of the electrode terminal located on the inner side of the cap plate extend beyond the mounting hole in a radial direction of the mounting hole, so as to fix the electrode terminal to the cap plate. In this case, since a part of the electrode terminal is located on the inner side of the cap plate, the electrode terminal occupies some space in the case. As a result, a gap between the electrode assembly and the cap plate is too large to fully utilize the space in the case, thereby causing a low energy density of the entire secondary battery.

SUMMARY

The embodiments of the present disclosure disclose a secondary battery and a method of manufacturing the secondary battery. The configuration of the secondary battery is conducive to increasing energy density.

On one aspect, embodiments of the present disclosure discloses a secondary battery, including: a case; an electrode assembly, accommodated in the case and including a main body and a tab connected to the main body; a cap plate, coupled to the case; an electrode terminal, located on an outer side of the cap plate and including a first metal layer and a second metal layer disposed one on top of another, wherein the second metal layer is located on a side of the first metal layer away from the cap plate, and the first metal layer and the second metal layer are made of different materials, and wherein the electrode terminal is provided with a stepped hole, which includes a first hole segment penetrating through the first metal layer and a second hole segment penetrating through the second metal layer and extending into the first metal layer; and a current collecting member, connected between the tab and the electrode terminal, wherein the current collecting member includes an extending portion extending toward the electrode terminal and protruding into the first hole segment, and directly connected to the first metal layer, and the first metal layer is made of the same material as the current collecting member.

According to one aspect of the embodiments of the present disclosure, both of the first metal layer and the current collecting member are made of copper, and the second metal layer is made of aluminum; or both of the first metal layer and the current collecting member are made of aluminum, and the second metal layer is made of copper.

According to one aspect of the embodiments of the present disclosure, the second hole segment has a diameter larger than that of the first hole segment, and the extending portion is welded to the first metal layer.

According to one aspect of the embodiments of the present disclosure, the second hole segment includes a sink portion disposed in the first metal layer, and a top surface of the extending portion is flush with a bottom surface of the sink portion.

According to one aspect of the embodiments of the present disclosure, a composite connection interface is formed between the first metal layer and the second metal layer, and the secondary battery further includes a connecting member abutting against the second metal layer and forming a contact interface together with the second metal layer, wherein the contact interface is located above the composite connection interface.

According to one aspect of the embodiments of the present disclosure, the extending portion and the first metal layer are welded to each other, by which an annular welding seam is formed so as to connect the extending portion and the first metal layer in a sealed manner.

According to one aspect of the embodiments of the present disclosure, the current collecting member further includes a connecting portion connected to the extending portion, and the connecting portion is located on an inner side of the cap plate and directly connected to the tab, wherein the connecting portion is formed in a sheet-like shape and is made of the same material as the tab.

According to one aspect of the embodiments of the present disclosure, the current collecting member further includes a projection connected between the extending portion and the connecting portion, and a recess is formed on a side of the projection away from the electrode terminal by forming the projection.

According to one aspect of the embodiments of the present disclosure, the extending portion, the projection and the connecting portion are formed into an integral member.

According to one aspect of the embodiments of the present disclosure, the projection is provided with a through hole, and the extending portion is adapted to pass through the through hole; and the current collecting member further includes a support portion connected with the extending portion, and the support portion is accommodated in the recess.

According to one aspect of the embodiments of the present disclosure, the support portion is adapted to extend beyond an inner wall of the through hole in a radial direction of the through hole.

According to one aspect of the embodiments of the present disclosure, the extending portion is formed as a hollow cylindrical member having a blind hole, and the blind hole is provided with an opening toward the electrode assembly.

According to one aspect of the embodiments of the present disclosure, the second hole segment has a diameter larger than that of the first hole segment, and the extending portion is welded to the first metal layer.

According to one aspect of the embodiments of the present disclosure, the second hole segment includes a sink portion disposed in the first metal layer, and a top surface of the extending portion is flush with a bottom surface of the sink portion.

On a further aspect, embodiments of the present disclosure proposes a battery module including a plurality of secondary batteries according to any of the above embodiments.

On a further aspect, embodiments of the present disclosure proposes a battery pack including at least one battery module according to any of the above embodiments.

On a further aspect, embodiments of the present disclosure proposes an apparatus using a secondary battery as a power source, wherein the secondary battery is a secondary battery according to any of the above embodiments.

On a further aspect, embodiments of the present disclosure discloses a method of manufacturing a secondary battery, including steps of:

providing an electrode assembly including a main body and a tab connected to the main body;

providing a current collecting member, and connecting and fixing the tab to the current collecting member, wherein the current collecting member includes an extending portion;

providing an electrode terminal and a cap plate, wherein the electrode terminal is located on an outer side of the cap plate and includes a first metal layer and a second metal layer disposed one on top of another, and the second metal layer is located on a side of the first metal layer away from the cap plate and is made of different material from the first metal layer, and wherein the electrode terminal is provided with a stepped hole, which includes a first hole segment penetrating through the first metal layer and a second hole segment penetrating through the second metal layer and extending into the first metal layer;

inserting the extending portion into the first hole segment from an inner side of the cap plate, wherein the first metal layer is made of the same material as the current collecting member; and providing a case, loading the electrode assembly into the case, and performing laser welding from the outer side of cap plate so as to weld the extending portion to the first metal layer by the laser welding.

BRIEF DESCRIPTION OF THE DRAWINGS

Features, advantages, and technical effects of the present disclosure will be described below with reference to accompanying drawings.

FIG. 13 is a flow chart showing a method of manufacturing a secondary battery according to an embodiment of the present disclosure.

Figure 1:
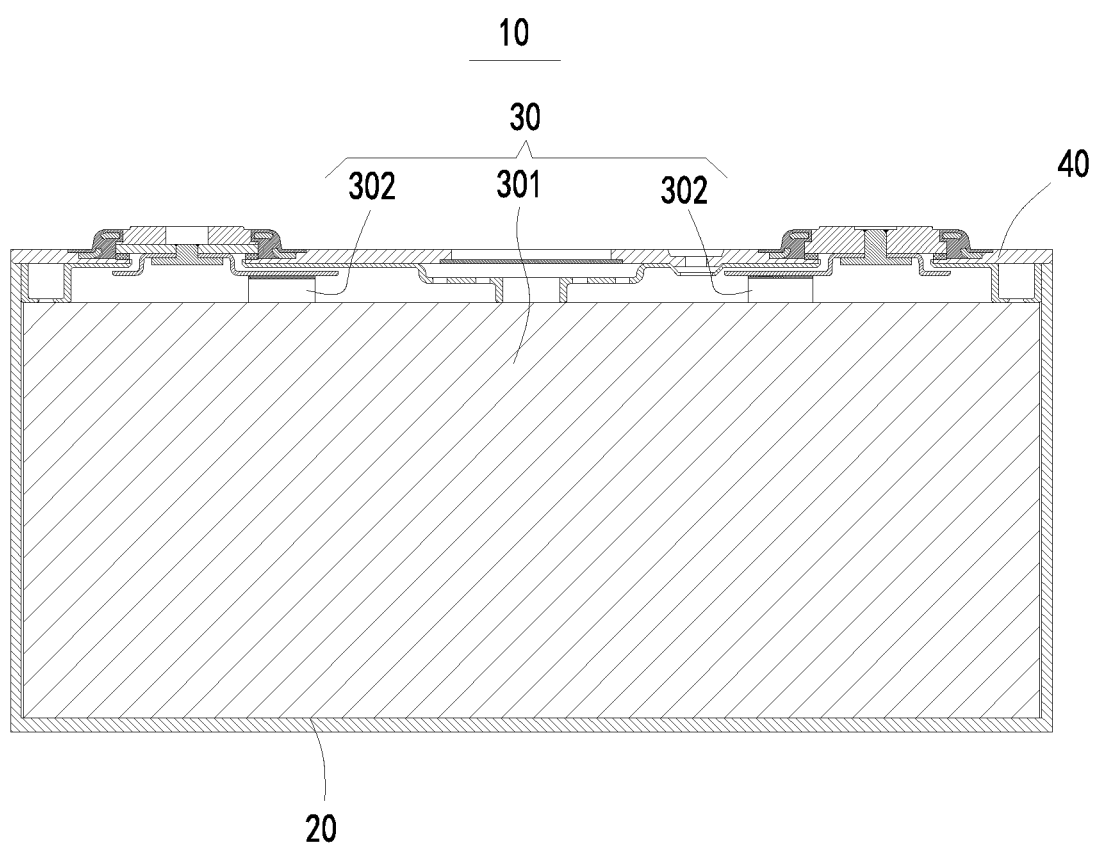
FIG. 1 schematically shows a cross-sectional view of a secondary battery according to an embodiment of the present disclosure.

In the drawings, the drawings are not drawn to scale.

REFERENCE NUMERALS 10, secondary battery;
20, case;
30, electrode assembly; 301, main body; 302, tab;
40, cap assembly;
50, cap plate; 501, electrode lead-out hole;
60, electrode terminal; 601, first metal layer; 601a, first hole segment; 602, second metal layer; 602a, second hole segment; 602b, sink portion; 603, composite connection interface; 604, flange; 604a, contact interface;
70, current collecting member; 701, extending portion; 701a, top surface; 702, connecting portion; 702a, projection; 702b, recess; 703, support portion;
80, connecting member;
90, insulating member;
100, sealing member.

DETAILED DESCRIPTION

Below, embodiments of the present disclosure will be further described in detail with reference to the accompanying drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality of" is two or more; the orientation or positional relationship indicated by the term "upper", "lower", "left", "right", "inner", "outer" or the like is merely for the purpose of describing the present disclosure and simplifying the description, and is not intended to indicate or imply that the device or component referred to has a particular orientation, or is constructed and operated in a particular orientation, and therefore cannot be understood to be a limitation of the present disclosure. Moreover, the terms "first", "second" and the like are used for descriptive purposes only and are not to be construed as indicating or implying relative importance.

In the description of the present disclosure, it should be noted that, unless otherwise stated and defined clearly, the terms "installation", "couple", and "connection" are to be understood broadly, and may be, for example, a fixed connection, a disassemble connection, or an integral connection, and may be a direct connection or an indirect connection through an intermediate medium. The specific meaning of the above terms in the present disclosure may be understood by the person skilled in the art according to actual circumstance.

In order to better understand the present disclosure, a secondary battery 10 according to an embodiment of the present disclosure will be described in detail below with reference to FIGS. 1-12.

Referring to FIG. 1, the secondary battery 10 according to an embodiment of the present disclosure includes a case 20, an electrode assembly 30 disposed in the case 20, and a cap assembly 40 coupled to the case 20 in a sealed manner.

The case 20 of the present embodiment may be formed in a hexahedral shape or in other shapes. The case 20 has an internal space for accommodating the electrode assembly 30 and electrolyte. The case 20 may be made of a material such as aluminum, aluminum alloy, or plastic.

The electrode assembly 30 of the present embodiment may include a main body 301, which is formed by stacking or winding a first electrode plate, a second electrode plate and a separator together, wherein the separator is an insulator interposed between the first electrode plate and the second electrode plate. In the present embodiment, description is made by exemplarily taking the first electrode plate as a positive electrode plate, and taking the second electrode plate as a negative electrode plate. Similarly, in other embodiments, the first electrode plate may be a negative electrode plate, and the second electrode plate is a positive electrode plate. Further, a positive active material is coated on a coating region of the positive electrode plate, and a negative active material is coated on a coating region of the negative electrode plate. A plurality of uncoated regions extending out from the main body 301 serve as a tab 302. The electrode assembly 30 includes two tabs 302, that is, a positive tab and a negative tab. The positive tab extends out from the coated region of the positive electrode plate, and the negative tab extends out from the coated region of the negative electrode plate.

Below, a technical solution of the secondary battery 10 is further described by means of specific embodiments. However, the following specific embodiments are not intended to limit a protective scope of the claims of the present disclosure.

Figure 2:
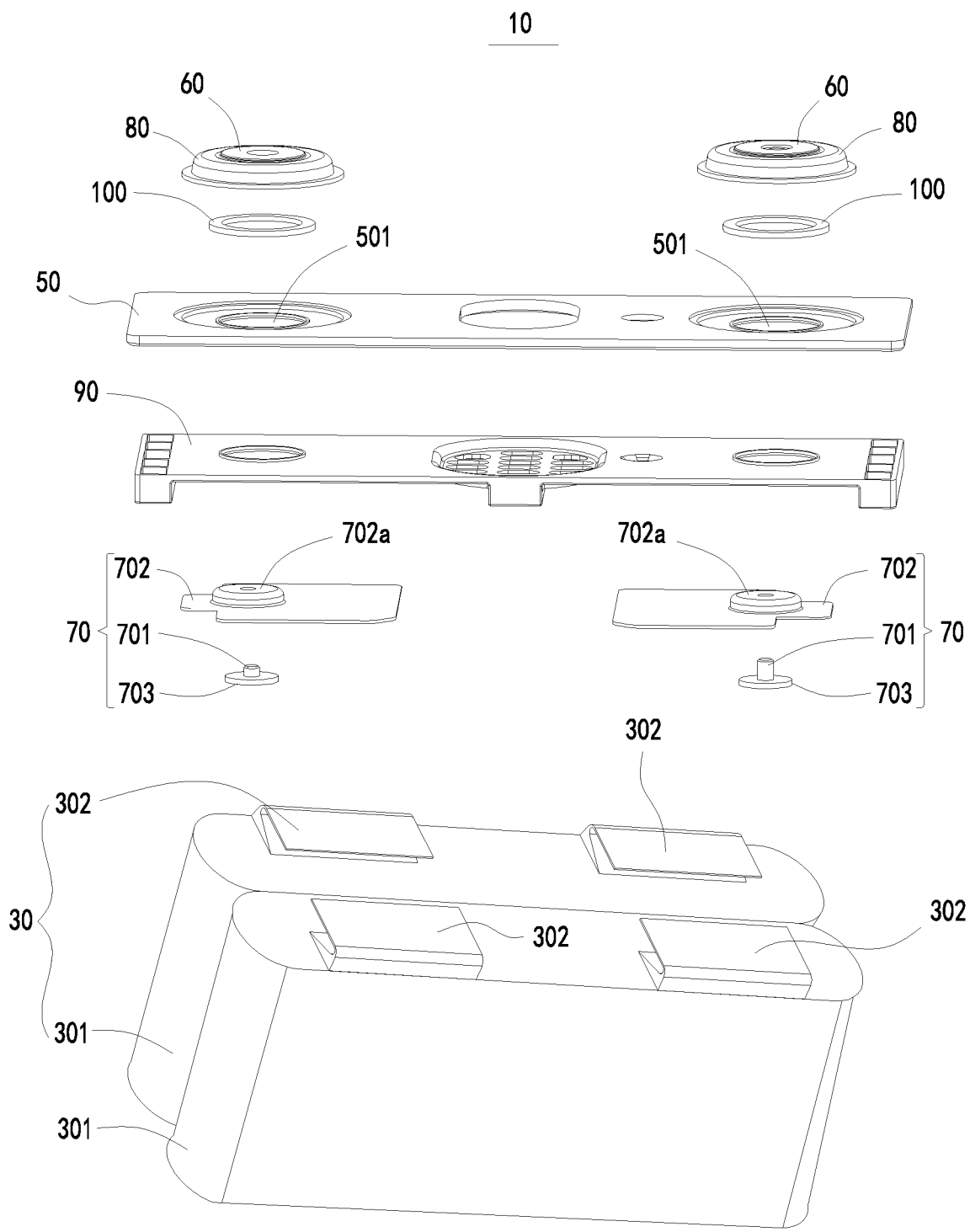
FIG. 2 schematically shows a partial exploded view of a secondary battery according to an embodiment of the present disclosure.

FIG. 2 schematically shows a partial exploded view of a secondary battery 10 according to an embodiment of the present disclosure. Referring to FIG. 2, the cap assembly 40 of the present embodiment includes a cap plate 50 coupled to the case 20 in a sealed manner, an electrode terminal 60 disposed on the cap plate 50, and a current collecting member 70 connected to the electrode terminal 60. The cap plate 50 of the present embodiment is provided with an electrode lead-out hole 501. In the present embodiment, an insulating member 90 is disposed between the cap plate 50 and the electrode assembly 30, to keep an insulation between the cap plate 50 and the electrode assembly 30. Two opposite ends of the insulating member 90 may abut against the electrode assembly 30 to prevent a movement of the electrode assembly 30 in the case 20. A sealing member 100 is disposed between the electrode terminal 60 and the cap plate 50. The sealing member 100 surrounds the electrode lead-out hole 501, and a sealing between the electrode terminal 60 and the cap plate 50 is kept by the sealing member 100.

Figure 3:
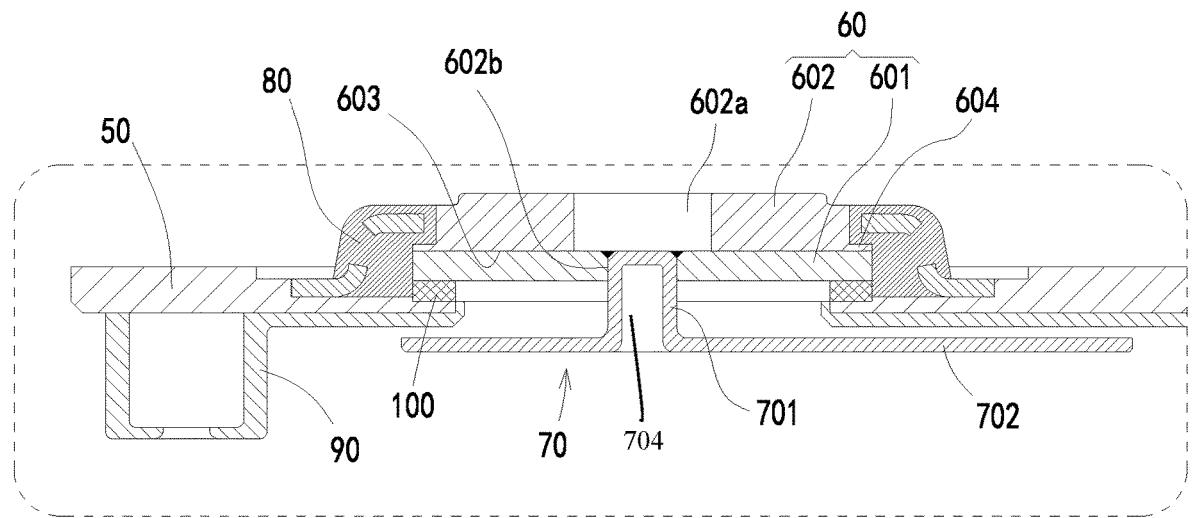
FIG. 3 schematically shows a cross-sectional view of a combination of a cap assembly and a current collecting member according to an embodiment of the present disclosure.
Figure 4:
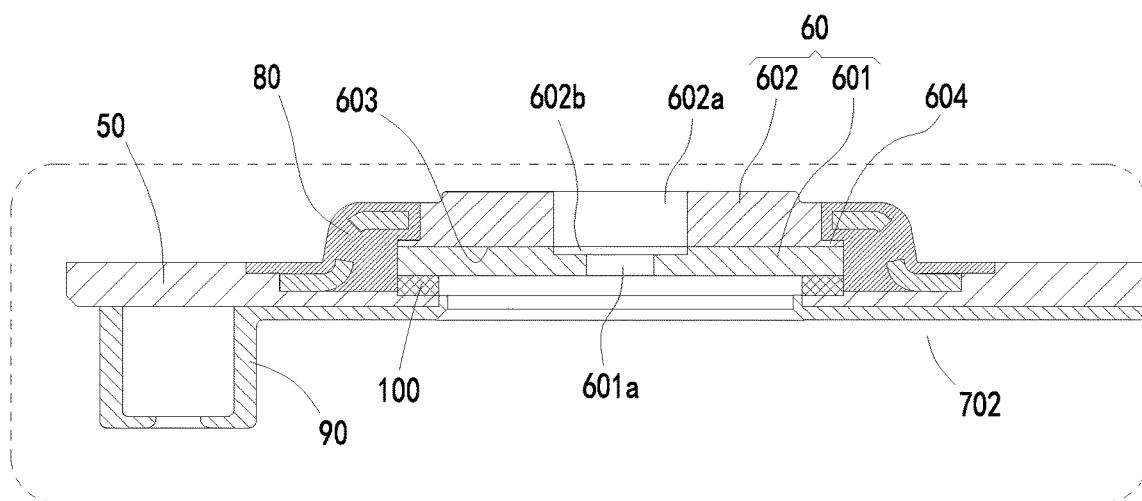
FIG. 4 schematically shows a partial cross-sectional view of a cap assembly according to an embodiment of the present disclosure.

FIG. 3 schematically shows a partial cross-sectional view of a combination of a cap assembly and a current collecting member according to an embodiment of the present disclosure. FIG. 4 schematically shows a partial cross-sectional view of a cap assembly according to an embodiment of the present disclosure. Referring to FIG. 3 and FIG. 4, the electrode terminal 60 is located on an outer side of the cap plate 50 and is provided with a stepped hole. In the present embodiment, the stepped hole of the electrode terminal 60 is disposed corresponding to the electrode lead-out hole 501 of the cap plate 50. In the present embodiment, the electrode terminal 60 is fixed with the cap plate 50. In the present embodiment, the current collecting member 70 includes an extending portion 701 and a connecting portion 702 connected to the extending portion 701. The connecting portion 702 is located on an inner side of the cap plate 50 and is directly connected to the tab 302 of the electrode assembly 30. Preferably, the connecting portion 702 is formed in a sheet-like shape, and the connecting portion 702 is connected to the tab 302 by ultrasonic welding. The extending portion 701 extends toward the electrode terminal 60 and protrudes into the stepped hole. The extending portion 701 is connected to the electrode terminal 60. Preferably, the extending portion 701 and the electrode terminal 60 are connected by laser welding. After protruding into the stepped hole, the extending portion 701 is exposed to a side of the electrode terminal 60 facing away from the cap plate 50. Laser light may be irradiated from the outer side of the cap plate 50 to regions to be connected of the extending portion 701 and of the electrode terminal 60, such that a portion of the extending portion 701 exposed to the side of the electrode terminal 60 facing away from the cap plate 50 may be connected to the electrode terminal 60 by laser welding. Since the laser light is incident from the outer side of the cap plate 50, metal particles generated by the laser welding will not fall into the inner side of the cap plate 50 (i.e., inside the case 20), and thus will not cause a short circuit of the electrode assembly 30. That is, a security risk brought by the laser welding may be eliminated.

In the present embodiment, the electrode terminal 60 includes a first metal layer 601 and a second metal layer 602 disposed one on top of another. The second metal layer 602 is located on a side of the first metal layer 601 away from the cap plate 50. The first metal layer 601 and the second metal layer 602 are made of different materials. The stepped hole of the electrode terminal 60 penetrates through the first metal layer 601 and the second metal layer 602. Referring to FIG. 4, the stepped hole of the electrode terminal 60 includes a first hole segment 601a and a second hole segment 602a. The second hole segment 602 penetrates through the second metal layer 602 and extends into the first metal layer 601. The first hole segment 601a penetrates through the first metal layer 601. The current collecting member 70 is connected between the tab 302 and the electrode terminal 60. The extending portion 701 included in the current collecting member 70 extends toward the electrode terminal 60 and protrudes into the first hole segment 601a. The extending portion 701 is directly connected to the first metal layer 601. The first metal layer 601 and the current collecting member 70 are made of the same material. Since the extending portion 701 of the current collecting member 70 and the first metal layer 601 of the electrode terminal 60 are made of the same material, the extending portion 701 and the first metal layer 601 may be connected and fixed to each other by laser welding, and the welding connection between the both is reliable, stable and has a high strength. Further, in the embodiment in which the extending portion 701 and the first metal layer 601 are connected and fixed to each other, the extending portion 701 does not protrude into the second hole segment 602a, and thus, the extending portion 701 does not interfere with a connection and fixing of a bus bar to the second metal layer 602.

In one embodiment, both of the first metal layer 601 and the current collecting member 70 are made of copper, and the second metal layer 602 is made of aluminum; or, both of the first metal layer 601 and the current collecting member 70 are made of aluminum, and the second metal layer 602 is made of copper. Since the second hole segment 602a penetrates through the second metal layer 602 and extends into the first metal layer 601 such that an upper surface of the first metal layer 601 is exposed, during the laser welding from the outer side of the cap plate 50, the second metal layer 602 may be prevented from being melted and mixed into a welding pool generated when the first metal layer 601 and the current collecting member 70 are welded. Since the first metal layer 601 and the second metal layer 602 are made of different materials, if the second metal layer 602 is melted and mixed into the welding pool generated when the first metal layer 601 and the current collecting member 70 are welded, a brittle metal compound will be generated and a welding strength will be lowered.

In the present embodiment, the second hole segment 602a has a diameter larger than that of the first hole segment 601a. The extending portion 701 is welded to the first metal layer 601. Since the diameter of the second hole segment 602a is larger than that of the first hole segment 601a, regions to be welded of the extending portion 701 and of the first metal layer 601 may be exposed by the second hole segment 602a, and thus laser light may be prevented from being irradiated on the second metal layer 602 during the laser welding, thereby facilitating a welding apparatus to weld the regions to be welded. In one embodiment, the extending portion 701 and the first metal layer 601 are welded by the laser welding, by which an annular welding seam is formed so as to connect the extending portion 701 and the first metal layer 601 in a sealed manner.

Referring to FIG. 3, the extending portion 701 of the present embodiment is a hollow member provided with a blind hole 704. The blind hole 704 of the extending portion 701 has an opening toward the electrode assembly 30. Such design of the extending portion 701 of the present embodiment is conducive to reducing an overall weight of the current collecting member 70 and increasing an energy density of the secondary battery 10. Meanwhile, the blind hole 704 of the extending portion 701 may accommodate gas generated when the secondary battery 10 is charged or discharged, thereby lowering an internal pressure of the case 20. In one example, the extending portion 701 and the connecting portion 702 may be formed by stamping for one time in a manner of stamping a sheet blank.

Referring to FIG. 4, in the present embodiment, a composite connection interface 603 is formed between the first metal layer 601 and the second metal layer 602. The secondary battery 10 further includes a connecting member 80. The connecting member 80 is connected to the cap plate 50. The connecting member 80 abuts against the second metal layer 602 and a contact interface 604a (referring to FIG. 7) is formed between the connecting member 80 and the second metal layer 602, so as to fix the electrode terminal 60 to the cap plate 50. The contact interface 604a is located above the composite connection interface 603. As such, a portion of the connecting member 80 is located above the composite connection interface 603, and thus may apply a pressure to the second metal layer 602, thereby preventing the composite connection interface 603 from being broken due to tensile stress. A sealing member 100 is disposed between the electrode terminal 60 and the cap plate 50. Since the electrode terminal 60 as a whole is restrained by the connecting member 80, the electrode terminal 60 cannot move in an axial direction of the electrode lead-out hole. As a result, on the one hand, a possibility of the electrode terminal 60 being disconnected from the sealing member may be lowered, and stability of the sealing between the electrode terminal 60 and the cap plate 50 may be improved; on the other hand, the welding seam formed between the extending portion 701 and the first metal layer 601 will not be subjected to a shear stress in the axial direction of the electrode lead-out hole, or will be subjected to a small shear stress in the axial direction of the electrode lead-out hole. In one embodiment, the second metal layer 602 has a flange 604 near an edge of the first metal layer 601, and the connecting member 80 abuts against the flange 604 and contacts with a surface of the flange 604 facing away from the first metal layer 601.

In the present embodiment, the connecting portion 702 is located on the inner side of the cap plate 50 and directly connected to the tab 302, and the connecting portion 702 is formed in a sheet-like shape, which is conducive to reducing an occupation ratio of the connecting portion 702 to the internal space of the case 20, and increasing the energy density of the secondary battery 10. Meanwhile, the connecting portion 702 and the tab 302 are made of the same material, and since the tab 302 is a sheet-like member, the tab 302 and the connecting portion 702 may be connected by ultrasonic welding, which may lower a possibility of metal particles being generated during the welding process of the tab 302 and the connecting portion 702, generate a large connection area between the tab 302 and the connecting portion 702, and make the welding connection reliable and stable.

The secondary battery 10 according to an embodiment of the present disclosure includes a cap plate 50, an electrode terminal 60 located on an outer side of the cap plate 50, and a current collecting member 70 connected to the electrode terminal 60. The electrode terminal 60 according to the embodiment of the present disclosure is connected to the cap plate 50 and located on the outer side of the cap plate 50, and the electrode assembly 30 is electrically connected to the electrode terminal 60 through the current collecting member 70. Since the electrode terminal 60 does not pass through the cap plate 50, the electrode terminal 60 does not occupy the internal space of the case 20. Therefore, a size of the electrode assembly 30 may be increased, which is conducive to increasing the energy density of the secondary battery 10. Further, the tab 302 of the electrode assembly 30 is electrically connected to the electrode terminal 60 through the current collecting member 70. During assembly of the secondary battery 10, the tab 302 of the electrode assembly 30 may be first connected and fixed to the current collecting member 70 (preferably by ultrasonic welding); then, the extending portion 70a included in the current collecting member 70 is mounted to the first hole segment 601a of the electrode terminal 60, the electrode assembly 30 is further loaded into the case 20, and the cap plate 50 is coupled to the case 20; finally, laser light is irradiated from the outer side of the cap plate 50 such that the extending portion 70a and the electrode terminal 60 is connected by laser welding. As such, a possibility that metal particles generated during the laser welding of the extending portion 701 and the electrode terminal 60 fall into the inside of the case 20 may be lowered, and an internal short circuit of the electrode assembly 30 may be avoided.

Figure 5:
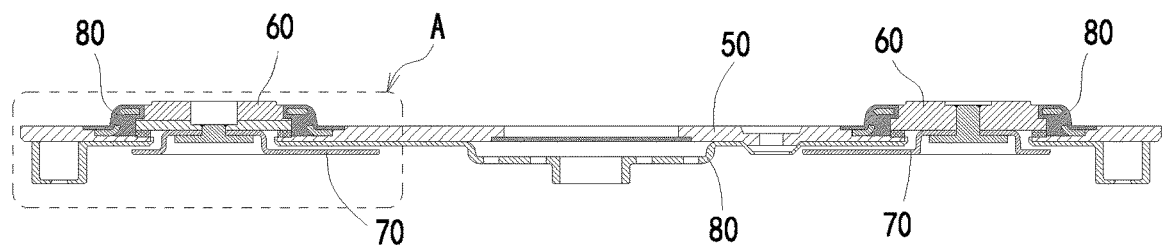
FIG. 5 schematically shows a cross-sectional view of a combination of a cap plate and a current collecting member according to a further embodiment of the present disclosure.
Figure 6:
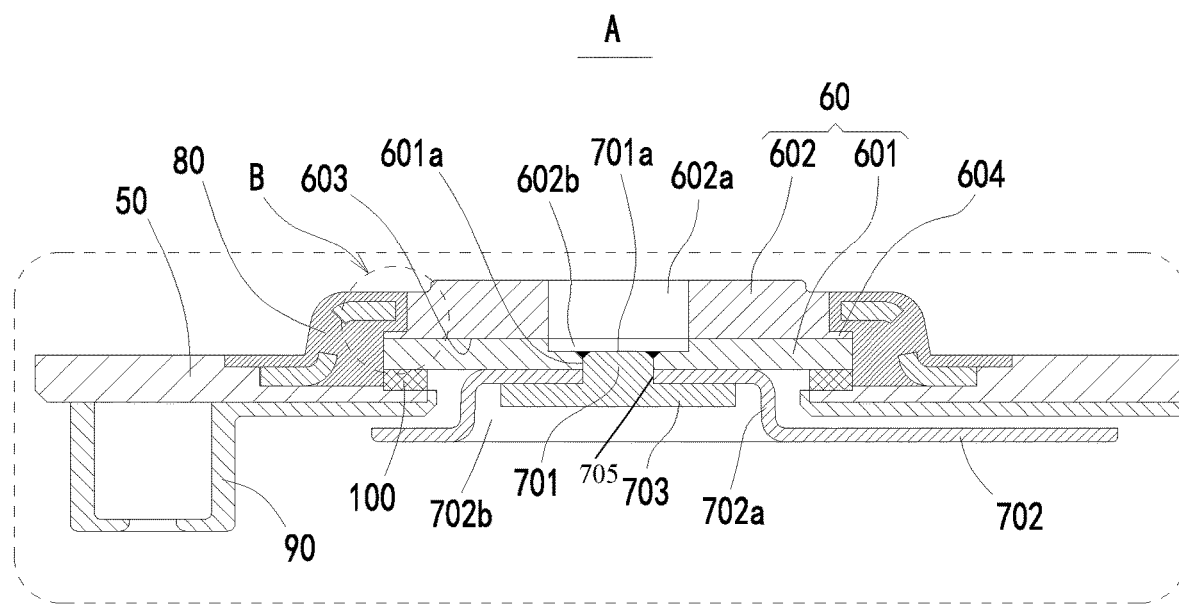
FIG. 6 schematically shows an enlarged view of a portion A in FIG. 5.
Figure 7:
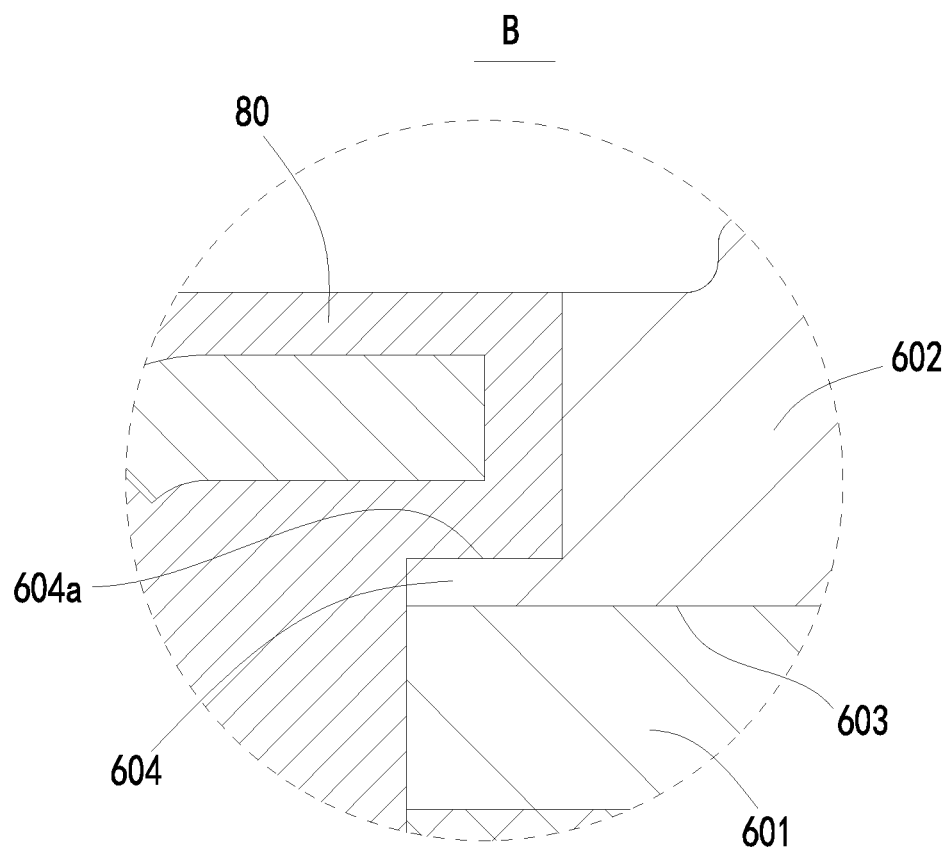
FIG. 7 schematically shows an enlarged view of a portion B in FIG. 6.

FIG. 5 schematically shows a cross-sectional view of a combination of a cap assembly and a current collecting member according to an embodiment of the present disclosure. FIG. 6 schematically shows an enlarged view of a portion A in FIG. 5. FIG. 7 schematically shows an enlarged view of a portion B in FIG. 6. In FIGS. 5 to 7, the same elements as those shown in FIGS. 2 to 4 are denoted by the same reference numerals, and description of the same configurations will not be repeated, while different configurations will be mainly illustrated. Referring to FIGS. 5 to 7, the current collecting member 70 of the present embodiment further includes a projection 702a. The projection 702a is connected between the extending portion 701 and the connecting portion 702. Meanwhile, a recess 702b is formed on a side of the projection 702a away from the electrode terminal 60 by forming the projection 702a. The projection 702a of the present embodiment is provided with a through hole 705. The through hole 705 is disposed corresponding to the first hole segment 601a. Preferably, the through hole 705 is disposed coaxially with the first hole segment 601a. The extending portion 701 of the present embodiment passes through the through hole 705 and protrudes into the first hole segment 601a of the stepped hole, and meanwhile, is directly connected to the first metal layer 601 of the electrode terminal 60. The current collecting member 70 of the present embodiment further includes a support portion 703 connected to the extending portion 701. The support portion 703 is received in the recess 702b. The extending portion 701 of the present embodiment is formed as a solid member. The support portion 703 is received in the recess 702b and extends beyond an inner wall of the through hole 705 in a radial direction of the through hole 705. Preferably, the extending portion 701 is connected to the first metal layer 601 of the electrode terminal 60 by laser welding. During the laser welding, laser light is incident from the outer side of the cap plate 50, and thus it is possible to effectively prevent metal particles generated during the laser welding from falling into the case 20. After the extending portion 701 is connected and fixed to the electrode terminal 60, the support portion 703 may tightly pull the projection 702a upward, and the projection 702a may be clamped by the support portion 703 and the electrode terminal 60 together, to maintain a positional stability of the projection 702a. In one embodiment, the support portion 703 is formed as a disk-like member.

Referring to FIG. 6, the second hole segment 602a of the present embodiment includes a sink portion 602b. The sink portion 602b is disposed in the first metal layer 601. A top surface 701a of the extending portion 701 is flush with a bottom surface of the sink portion 602b. When the extending portion 701 and the first metal layer 601 are connected and fixed by laser welding, laser light is incident from the outer side of the cap plate 50 and in a direction perpendicular to the bottom surface of the sink portion 602b. The laser light melts the extending portion 701 and the first metal layer 601. Since the top surface 701a of the extending portion 701 is flush with the bottom surface of the sink portion 602b, a power requirement of a laser generating apparatus may be advantageously lowered.

Figure 8:
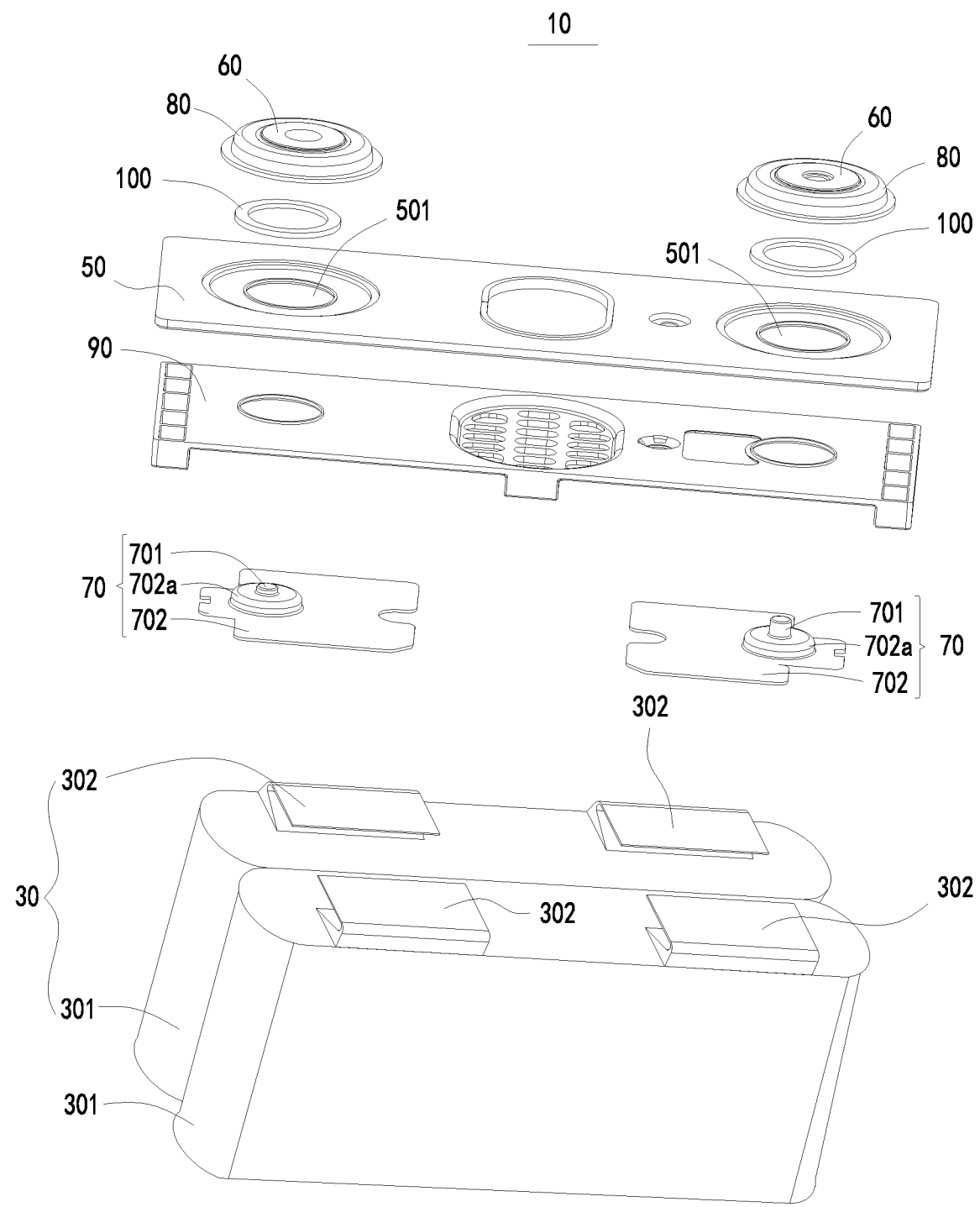
FIG. 8 schematically shows a partial exploded view of a secondary battery according to a further embodiment of the present disclosure.
Figure 9:
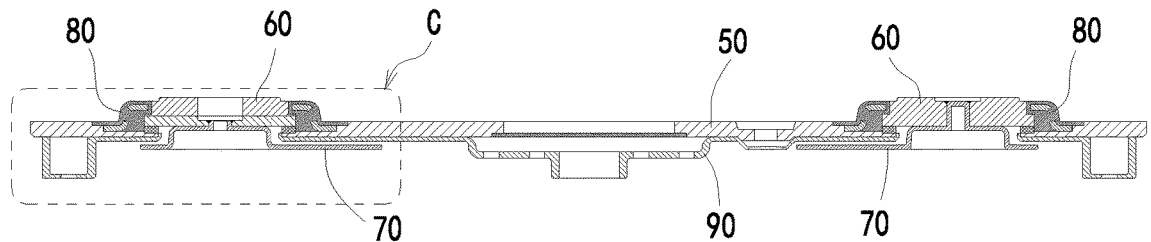
FIG. 9 schematically shows a cross-sectional view of a combination of a cap assembly and a current collecting member according to a further embodiment of the present disclosure.
Figure 10:
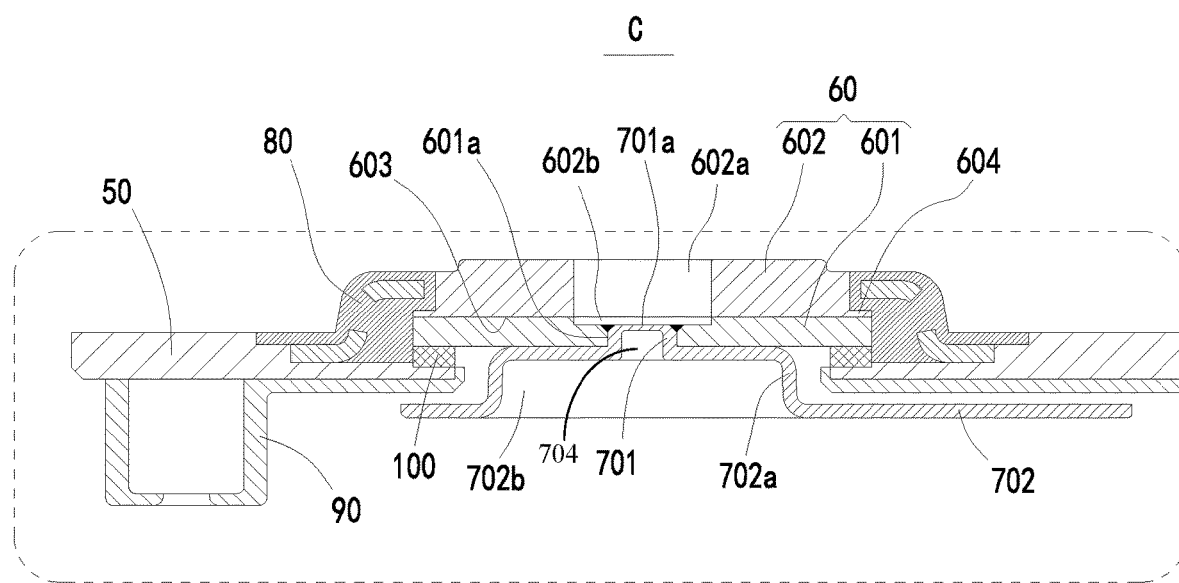
FIG. 10 schematically shows an enlarged view of a portion C in FIG. 9.

FIG. 8 schematically shows a partial exploded view of a secondary battery 10 according to another embodiment of the present disclosure. FIG. 9 schematically shows a cross-sectional view of a combination of a cap assembly and a current collecting member according to another embodiment of the present disclosure. FIG. 10 schematically shows an enlarged view of a portion C in FIG. 9. In FIGS. 8 to 10, the same elements as those shown in FIGS. 2 to 4 are denoted by the same reference numerals, and description of the same configurations will not be repeated, while different configurations will be mainly illustrated. Referring to FIG. 8, the current collecting member 70 of the present embodiment further includes a projection 702a. The projection 702a is connected between the extending portion 701 and the connecting portion 702. Referring to FIGS. 9 and 10, a recess 702b is formed on a side of the projection 702a away from the electrode terminal 60 by forming the projection 702a. In the present embodiment, the extending portion 701, the projection 702a, and the connecting portion 702 is formed into an integral member. The projection 702a of the present embodiment has a top surface facing the cap plate 50. The extending portion 701 of the present embodiment is connected to the top surface of the projection 702a.

Figure 11:
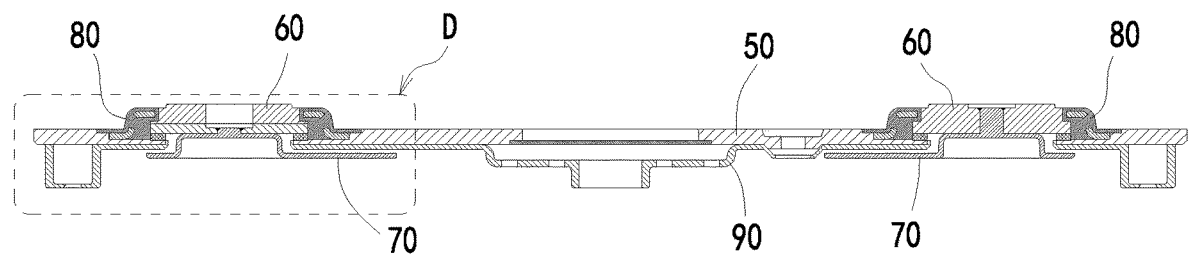
FIG. 11 schematically shows a cross-sectional view of a combination of a cap assembly and a current collecting member according to a still further embodiment of the present disclosure.
Figure 12:
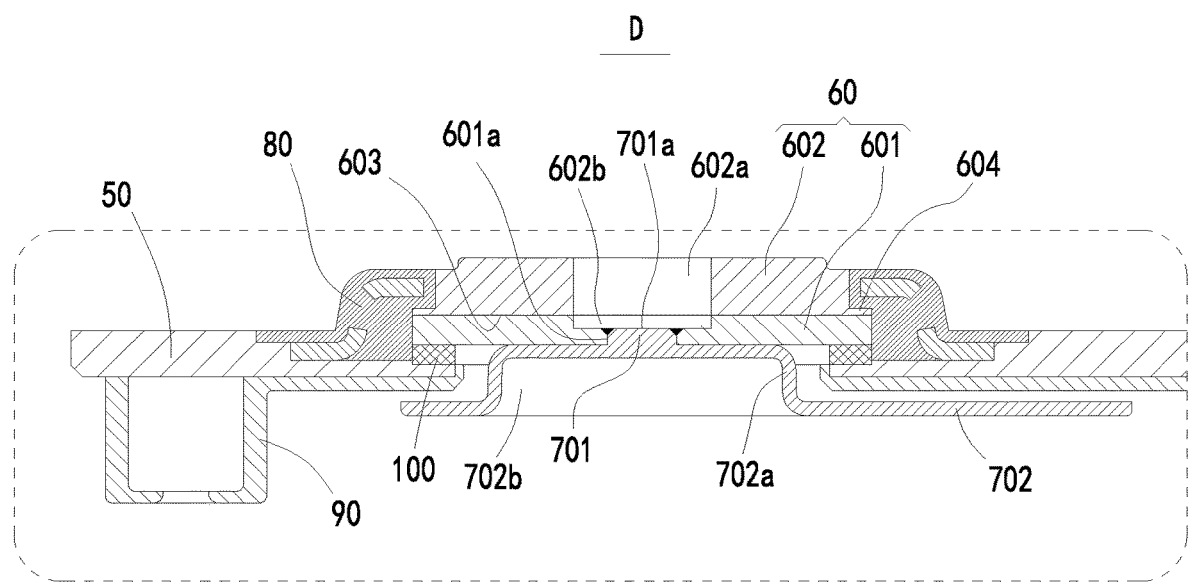
FIG. 12 schematically shows an enlarged view of a portion D in FIG. 11.

FIG. 11 schematically shows a cross-sectional view of a combination of a cap assembly and a current collecting member according to still another embodiment of the present disclosure. FIG. 12 schematically shows an enlarged view of a portion D in FIG. 11. In FIGS. 11 and 12, the same elements as those shown in FIGS. 8 to 10 are denoted by the same reference numerals, and description of the same configurations will not be repeated, while different configurations will be mainly illustrated. In one embodiment, referring to FIGS. 11 and 12, the extending portion 701 is formed as a solid columnar member and has a high rigidity, and thus the connection of the extending portion 701 with the electrode terminal 60 is stable and reliable. In another embodiment, referring to FIG. 10, the extending portion 701 is formed as a hollow cylindrical member having a blind hole 704. The blind hole 704 has an opening toward the electrode assembly 30. The blind hole 704 of the extending portion 701 is in communication with the recess 702b. Thus, on the one hand, it is conducive to reducing the overall weight of the current collecting member 70 and thus increasing the energy density of the secondary battery 10; on the other hand, both of the blind hole 704 and the recess 702b of the extending portion 701 may accommodate the gas generated when the secondary battery 10 is charged and discharged, thereby effectively lowering the internal pressure of the case 20.

Referring to FIG. 13, an embodiment of the present disclosure further discloses a method of manufacturing a secondary battery 10, wherein the method includes the following steps:

providing an electrode assembly 30, wherein the electrode assembly 30 includes a main body 301 and a tab 302 connected to the main body 301;

providing a current collecting member 70, and connecting and fixing the tab 302 to the current collecting member 70, wherein the current collecting member 70 includes an extending portion 701;

providing an electrode terminal 60 and a cap plate 50, wherein the electrode terminal 60 is disposed on an outer side of the cap plate 50 and includes a first metal layer 601 and a second metal layer 602 disposed one on top of another, and the second metal layer 602 is located on a side of the first metal layer 601 away from the cap plate 50 and is made of different material from the first metal layer 601, and wherein the electrode terminal 60 is provided with a stepped hole, which includes a first hole segment 601*a* penetrating through the first metal layer 601 and a second hole segment 601*b* penetrating through the second metal layer 602 and extending into the first metal layer 601;

inserting the extending portion 701 into the first hole segment 601*a* from an inner side of the cap plate 50, and the first metal layer 601 and the current collecting member 70 are made of the same material; and providing a case 20, loading the electrode assembly 30 into the case 20, and performing laser welding from the outer side of cap plate 50 so as to weld the extending portion 701 to the first metal layer 601 by the laser welding.

In one embodiment, the tab 302 and the connecting portion 702 are connected and fixed by ultrasonic welding, which may lower a possibility of generation of metal particles during the welding process, and is conducive to improving safety of the secondary battery 10.

In the method of manufacturing the secondary battery 10 according to the embodiment of the present disclosure, the current collecting member 70 and the tab 302 are connected and fixed to each other at first, and then the current collecting member 70 and the electrode terminal 60 are assembled with each other and the electrode assembly 30 is loaded into the case 20. Finally, laser welding is performed on the outer side of the cap plate 50 to connect and fix the extending portion 701 included in the current collecting member 70 to the electrode terminal 60. Thus, metal particles generated during the laser welding process of the extending portion 701 of the current collecting member 70 and the first metal layer 601 of the electrode terminal 60 will not fall into the case 20, thereby effectively ensuring a cleanliness of an internal space of the case 20, and lowering a possibility of occurrence of a short circuit of the electrode assembly 30.

In the present embodiment, the extending portion 701 and the electrode terminal 60 are welded in a sealed manner by laser welding, to ensure a stable connection between the extending portion 701 and the electrode terminal 60 with a high connection strength.

In one embodiment, the extending portion 701 is interference-fitted with the first hole segment 601*a*. Therefore, before the extending portion 701 and the electrode terminal 60 are connected and fixed to each other, it is not easy for the extending portion 701 to fall off from the first hole segment 601*a* or displace in the first hole segment 601*a*, thereby ensuring a connection stability of the current collecting member 70 and the electrode terminal 60 during assembly of the secondary battery 10, which is conducive to improving an efficiency of the following connecting and fixing operation of the extending portion 70*a* included in the current collecting member 70 and the electrode terminal 60. Further, since the extending portion 701 is interference-fitted with the first hole segment 601, there is no gap between the extending portion 701 and the electrode terminal 60.

Figure 14:
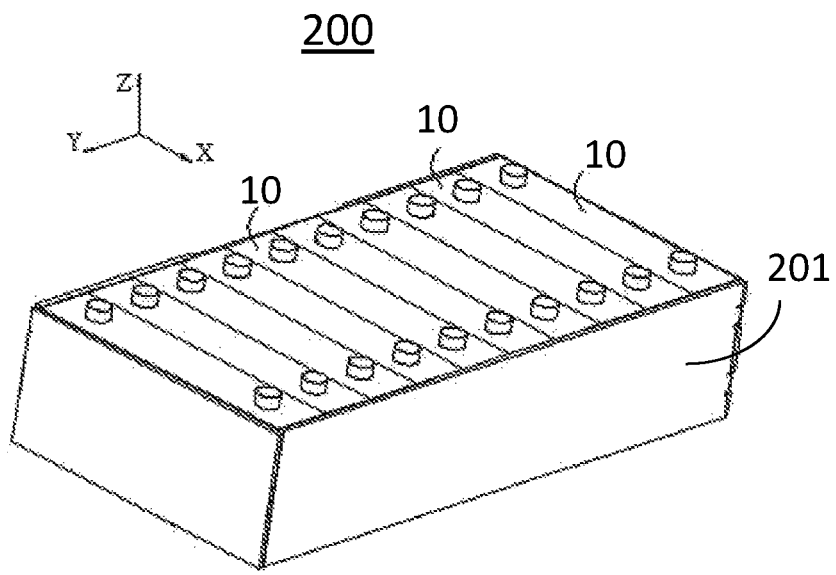
FIG. 14 schematically shows a battery module according to an embodiment of the present disclosure.
Figure 15:
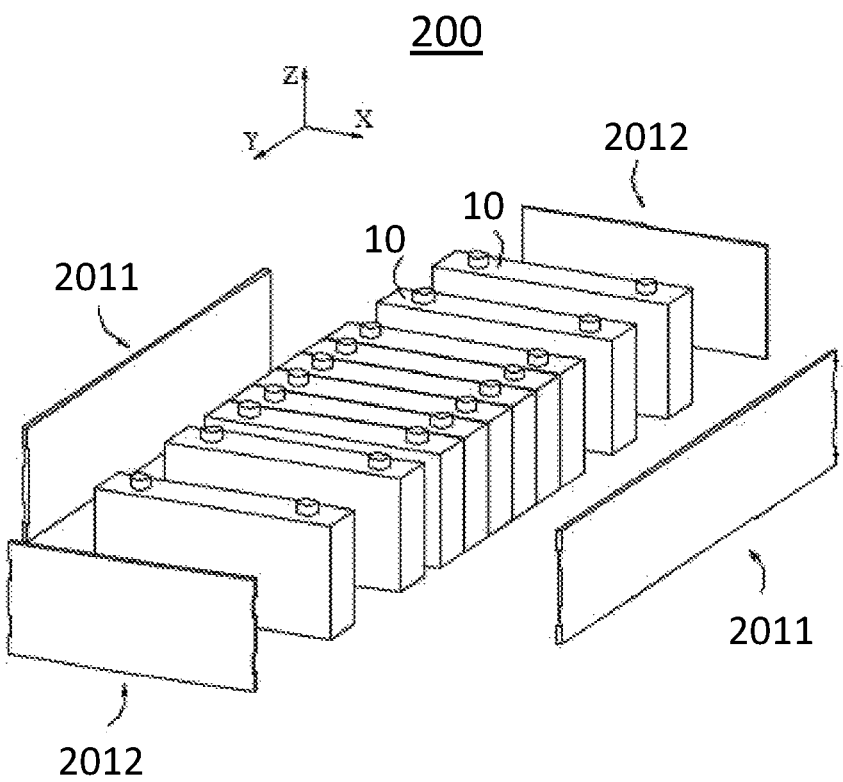
FIG. 15 is an exploded view of the battery module as shown in FIG. 14.

The present disclosure further proposes a battery module including a plurality of secondary batteries according to any of the above embodiments. In one embodiment, referring to FIG. 14 and FIG. 15, a battery module 200 includes a plurality of secondary batteries 10 and a housing 201 for accommodating the secondary batteries 10. The housing 201 includes a cavity and the secondary batteries are disposed in the cavity side by side. The housing 201 includes a pair of side plates 2011 and a pair of end plates 2012, which are connected to each other to form the housing 201. The arrangement of the secondary batteries and the configuration of the housing are not limited to the above embodiments, and any other suitable arrangements and configurations are available.

Figure 16:
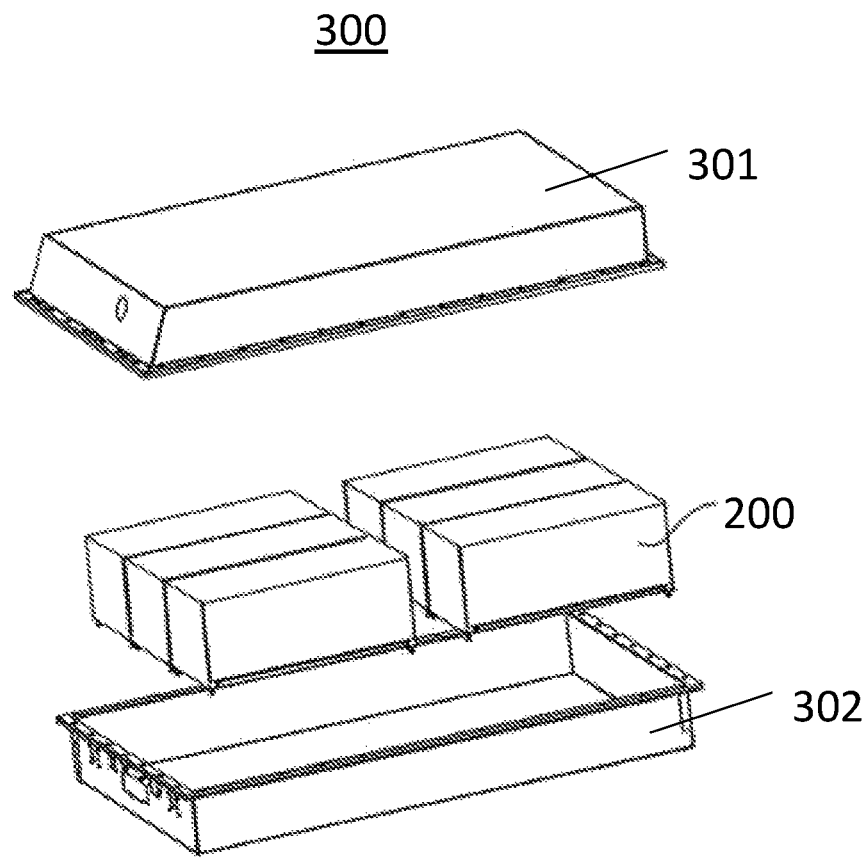
FIG. 16 is an exploded view of a battery pack according to an embodiment of the present disclosure.

The present disclosure further proposes a battery pack including at least one battery module according to any of the above embodiments. In one embodiment, referring to FIG. 16, a battery pack 300 includes a plurality of battery modules 200 and a casing for accommodating the battery modules 200. The casing includes a cavity and the battery modules 200 are disposed in the cavity side by side. The casing is formed as a box, and includes a lower case 302 for receiving the battery modules 200 and a cover 301 for closing the lower case 302. The arrangement of the battery modules and the configuration of the casing are not limited to the above embodiments, and any other suitable arrangements and configurations are available. For example, the casing may be formed into a frame shape, or a disk shape.

Figure 17:
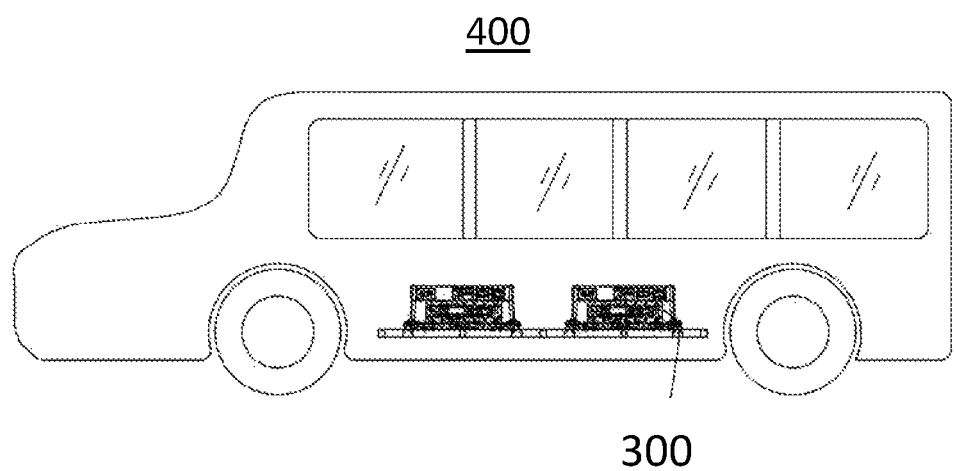
FIG. 17 schematically shows an apparatus using a secondary battery as a power source according to an embodiment of the present disclosure.

The present disclosure further proposes an apparatus using the secondary battery according to any of the above embodiments as a power source. The apparatus may be a movable device, such as a vehicle, a ship, a small aircraft, etc. The vehicle may be a new energy vehicle, for example, a pure electric vehicle or a hybrid vehicle. In one embodiment, referring to FIG. 17, a vehicle 400 includes a battery pack 300 according to any of the above embodiments, and uses the battery pack 300 as a power source. As shown in FIG. 17, the battery pack 300 is located a lower portion of the vehicle 400. However, the present disclosure is not limited to the above embodiment, and the battery pack 300 may be located at any other suitable positions of the vehicle 400.

Although the present disclosure has been described with reference to the preferred embodiments, various modifications may be made to the present disclosure and components may be replaced with equivalents without departing from the scope of the present disclosure. In particular, the technical features mentioned in the various embodiments may be combined in any manner as long as there is no structural conflict. The present disclosure is not limited to the specific embodiments disclosed herein, but includes all technical solutions falling within the scope of the claims.

What is claimed is:

1. A secondary battery, comprising:
   a case;
   an electrode assembly, accommodated in the case and comprising a main body and a tab connected to the main body;
   a cap plate, coupled to the case;
   an electrode terminal, located on an outer side of the cap plate and comprising a first metal layer and a second metal layer disposed one on top of another, wherein the second metal layer is located on a side of the first metal layer away from the cap plate, and the first metal layer and the second metal layer are made of different materials, and wherein the electrode terminal is provided with a stepped hole, which comprises a first hole segment penetrating through the first metal layer and a second hole segment penetrating through the second metal layer and extending into the first metal layer; and
   a current collecting member, connected between the tab and the electrode terminal, wherein the current collecting member comprises an extending portion extending toward the electrode terminal and protruding into the first hole segment, and directly connected to the first metal layer, and the first metal layer is made of the same material as the current collecting member, wherein the second hole segment has a diameter larger than that of the first hole segment, and the extending portion is welded to the first metal layer, wherein the current collecting member further comprises:
- a connecting portion located on an inner side of the cap plate and directly connected to the tab;
- a projection connected between the extending portion and the connecting portion; and
- a support portion connected to the extending portion, wherein a recess is formed on a side of the projection away from the electrode terminal by forming the projection; the projection is provided with a through hole and the extending portion passes through the through hole; the support portion is received in the recess and fixes the connecting portion; and
- wherein the support portion extends beyond an inner wall of the through hole in a radial direction of the through hole, and the projection is clamped by the support portion and the electrode terminal together, wherein the secondary battery further comprises an insulating member disposed on the inner side of the cap plate, the insulating member is located between the connecting portion of the current collecting member and the cap plate and surrounds the projection of the current collecting member in a circumferential direction, so as to electrically insulate the current collecting member from the cap plate.

2. The secondary battery according to claim 1, wherein, both of the first metal layer and the current collecting member are made of copper, and the second metal layer is made of aluminum.

3. The secondary battery according to claim 1, wherein, both of the first metal layer and the current collecting member are made of aluminum, and the second metal layer is made of copper.

4. The secondary battery according to claim 1, wherein the second hole segment includes a sink portion disposed in the first metal layer, and a top surface of the extending portion is flush with a bottom surface of the sink portion.

5. The secondary battery according to claim 1, wherein an annular welding seam is formed between the extending portion and the first metal layer so as to connect the extending portion and the first metal layer in a sealed manner.

6. The secondary battery according to claim 4, wherein an annular welding seam is formed between the extending portion and the first metal layer so as to connect the extending portion and the first metal layer in a sealed manner.

7. The secondary battery according to claim 1, wherein a composite connection interface is formed between the first metal layer and the second metal layer, and the secondary battery further comprises a connecting member abutting against the second metal layer and forming a contact interface together with the second metal layer, wherein the contact interface is located above the composite connection interface.

8. The secondary battery according to claim 1, wherein the connecting portion is formed in a sheet-like shape and is made of the same material as the tab.

9. The secondary battery according to claim 2, wherein the second hole segment includes a sink portion disposed in the first metal layer, and a top surface of the extending portion is flush with a bottom surface of the sink portion.

10. A battery module, comprising:
a plurality of secondary batteries according to claim 1.

11. A vehicle, comprising a battery pack, wherein the battery pack comprises a plurality of battery modules according to claim 10.

12. A method of manufacturing a secondary battery according to claim 1, comprising steps of:
- providing a current collecting member, wherein the current collecting member comprises an extending portion;
- providing an electrode terminal and a cap plate, wherein the electrode terminal is located on an outer side of the cap plate and comprises a first metal layer and a second metal layer disposed one on top of another, and the second metal layer is located on a side of the first metal layer away from the cap plate and is made of different material from the first metal layer, and wherein the electrode terminal is provided with a stepped hole, which comprises a first hole segment penetrating through the first metal layer and a second hole segment penetrating through the second metal layer and extending into the first metal layer, and the first metal layer is made of the same material as the current collecting member;
- inserting the extending portion into the first hole segment from an inner side of the cap plate; and
- performing laser welding from the outer side of cap plate so as to weld the extending portion to the first metal layer by the laser welding, wherein the second hole segment has a diameter larger than that of the first hole segment, wherein the current collecting member further comprises:
- a connecting portion located on an inner side of the cap plate;
- a projection connected between the extending portion and the connecting portion; and
- a support portion connected to the extending portion, wherein a recess is formed on a side of the projection away from the electrode terminal by forming the projection; the projection is provided with a through hole and the extending portion passes through the through hole; the support portion is received in the recess and fixes the connecting portion; and
- wherein the support portion extends beyond an inner wall of the through hole in a radial direction of the through hole, and the projection is clamped by the support portion and the electrode terminal together, wherein the method further comprises a step of providing an insulating member, the insulating member is disposed on the inner side of the cap plate, is located between the connecting portion of the current collecting member and the cap plate, and surrounds the projection of the current collecting member in a circumferential direction, so as to electrically insulate the current collecting member from the cap plate.

* * * * *